United States Patent
Wu et al.

(10) Patent No.: US 11,549,649 B2
(45) Date of Patent: Jan. 10, 2023

(54) DEVICE AND METHOD FOR DETECTING AND ABLATING HYDRATES IN NATURAL GAS PIPELINE

(71) Applicant: Guangzhou Marine Geological Survey, Guangzhou (CN)

(72) Inventors: Tingting Wu, Guangzhou (CN); Jiangong Wei, Guangzhou (CN)

(73) Assignee: GUANGZHOU MARINE GEOLOGICAL SURVEY, Guangzhou (CN)

( * ) Notice: Subject to any disclaimer, the term of this patent is extended or adjusted under 35 U.S.C. 154(b) by 0 days.

(21) Appl. No.: 17/470,701

(22) Filed: Sep. 9, 2021

(65) Prior Publication Data

US 2022/0034456 A1 Feb. 3, 2022

Related U.S. Application Data

(63) Continuation of application No. PCT/CN2021/109188, filed on Jul. 29, 2021.

(30) Foreign Application Priority Data

Jul. 31, 2020 (CN) .......................... 202010760121.1

(51) Int. Cl.
*F17D 5/00* (2006.01)
*F16L 53/34* (2018.01)
(Continued)

(52) U.S. Cl.
CPC .............. *F17D 5/005* (2013.01); *F16L 53/34* (2018.01); *F16L 55/28* (2013.01); *F16L 55/32* (2013.01);
(Continued)

(58) Field of Classification Search
CPC .... F17D 5/005; F17D 5/02; F17D 1/02; F16L 53/34; F16L 55/28; F16L 55/32; F16L 2101/10; F16L 2101/30; F16L 2101/32
See application file for complete search history.

(56) References Cited

U.S. PATENT DOCUMENTS 5,698,854 A * 12/1997 Gupta .................... G01N 23/18
250/358.1
6,450,104 B1 * 9/2002 Grant ...................... B08B 9/049
104/138.1
(Continued)

FOREIGN PATENT DOCUMENTS

CN 101691128 A 7/2010
CN 107543009 A 1/2018
(Continued)

OTHER PUBLICATIONS

Office Action dated Mar. 1, 2021 issued in corresponding China Application No. 202010760121 (with English translation).
(Continued)

*Primary Examiner* — William M McCalister
(74) *Attorney, Agent, or Firm* — Muncy, Geissler, Olds & Lowe, P.C.

(57) ABSTRACT

The present application discloses a device and method for detecting and ablating hydrates in a natural gas pipeline. The device includes a transmission mechanism, a detection mechanism and an ablation mechanism. The detection mechanism and the ablation mechanism are both connected to the transmission mechanism through an elastic connector, such that the device can smoothly pass through bends in the natural gas pipeline. The transmission mechanism includes a universal wheel component, which forms static friction with an outer wall of an inner natural gas pipeline, such that the device can move along the inner natural gas pipeline. The detection mechanism detects the temperature of the
(Continued)

natural gas pipeline and determines whether hydrates are generated in the natural gas pipeline to block the pipeline, and then the blockage is heated by the ablation mechanism to ablate the hydrates.

9 Claims, 5 Drawing Sheets

(51) Int. Cl.
  *F16L 55/28* (2006.01)
  *F16L 55/32* (2006.01)
  *F16L 101/10* (2006.01)
  *F16L 101/30* (2006.01)

(52) U.S. Cl.
  CPC ....... *F16L 2101/10* (2013.01); *F16L 2101/30* (2013.01)

(56) References Cited

U.S. PATENT DOCUMENTS

| | | | | |
|---|---|---|---|---|
| 6,917,176 B2 * | 7/2005 | Schempf | ............... | G01M 3/005 901/44 |
| 8,950,338 B2 * | 2/2015 | Early | ............... | F16L 55/34 104/138.1 |
| 9,101,967 B2 * | 8/2015 | Farkavec | ............. | B62D 55/065 |
| 9,353,902 B2 * | 5/2016 | Early | ............... | F16L 55/265 |
| 9,366,596 B2 * | 6/2016 | Mekid | ................ | G01M 3/2823 |
| 2002/0190682 A1 * | 12/2002 | Schempf | ............. | G01N 29/265 318/568.11 |
| 2018/0031168 A1 * | 2/2018 | Littlestar | ............... | G08C 19/00 |
| 2020/0088339 A1 * | 3/2020 | Wehlin | ................ | B60K 7/0007 |

FOREIGN PATENT DOCUMENTS

| | | |
|---|---|---|
| CN | 207371980 U | 5/2018 |
| CN | 108150757 A | 6/2018 |
| CN | 108386714 A | 8/2018 |
| CN | 208871338 U | 5/2019 |
| CN | 210426119 U | 5/2020 |
| GB | 2301414 A | 12/1996 |
| GB | 2527187 A | 12/2015 |
| JP | S61-179724 A | 8/1986 |
| JP | 2001-66075 A | 3/2001 |

OTHER PUBLICATIONS

Office Action dated Mar. 25, 2021 issued in corresponding China Application No. 202010760121 (with English translation).

Decision to Grant a Patent dated Apr. 22, 2021 issued in corresponding China Application No. 202010760121 (with English translation).

* cited by examiner

DEVICE AND METHOD FOR DETECTING AND ABLATING HYDRATES IN NATURAL GAS PIPELINE

CROSS REFERENCE TO RELATED APPLICATIONS

This application is a Continuation of International Application No. PCT/CN2021/109188, filed on Jul. 29, 2021, for which priority is claimed under 35 U.S.C. § 120; and this application claims priority of Application No. 202010760121.1 filed in China on Jul. 31, 2020 under 35 U.S.C. § 119; the entire contents of all of which are hereby incorporated by reference.

TECHNICAL FIELD

The present application relates to the technical field of natural gas hydrate detection, in particular to a device and method for detecting and ablating hydrates in a natural gas pipeline.

BACKGROUND

With the continuous deepening of offshore oil and gas development, especially in 2017 and 2020, China has successfully realized the trial production of natural gas hydrates in the sea. It is expected that the commercial development of natural gas hydrates will be realized in 2030, which puts forward higher technical requirements for offshore production systems. Natural gas is prone to form solid natural gas hydrates in a low-temperature and high-pressure submarine environment. When natural gas or natural gas hydrates are being exploited, natural gas hydrates may form solid crystals due to interruption in transportation or gas retention at pipeline joints or bends, which causes blockage of the transportation pipeline, and even threatens the safe operation of the transportation pipeline, thereby affecting normal production operations.

In the process of trial exploitation of natural gas hydrates, in order to inhibit the formation of solid hydrates of natural gas, methods of injecting methanol, ethylene glycol and depressurizing the formation can be adopted. But for the transportation pipeline, scholars generally believe that the injection of inhibitors is an effective means to inhibit the formation of hydrates. The use of inhibitors has certain limitations. First of all, the choice of different inhibitors will cause different results. At present, it is still in constant research and determination. In addition, the effect of inhibitors also has certain limitations. Due to the complicated pipeline environment and the unpredictable location of the blockage, improper blocking removal methods will cause serious damage to the pipeline and affect the safety and normal operation of the entire transportation system.

SUMMARY

In order to overcome the shortcomings of the prior art, a first objective of the present application is to provide a device for detecting and ablating hydrates in a natural gas pipeline, which can solve the problem of blockage of natural gas pipelines by hydrates.

In order to overcome the shortcomings of the prior art, a second objective of the present application is to provide a method for detecting and ablating hydrates in a natural gas pipeline, which can solve the problem of blockage of natural gas pipelines by hydrates.

In order to achieve one of the above objectives, the technical solutions adopted by the present application are as follows.

A device for detecting and ablating hydrates in a natural gas pipeline, comprising: a plurality of transmission mechanisms movable along an inner natural gas pipeline, a detection mechanism configured to detect the hydrates in the natural gas pipeline, an ablation mechanism configured to ablate the hydrates, and a controller, wherein the transmission mechanism comprises a transmission frame, a plurality of universal wheel components that generate static friction with an outer wall of the inner natural gas pipeline, a drive component, and an elastic connector; the detection mechanism comprises a detection frame and a detection component; the ablation mechanism comprises an ablation frame, an ablation component, and an ablation claw component, and wherein the universal wheel component is arranged on an inner wall of the transmission frame in a circumferential direction, the drive component is connected to the universal wheel component, the detection frame and the ablation frame are both connected to the transmission frame through the elastic connector, the detection component is arranged on the detection frame, the ablation component and the ablation claw component are both arranged on the ablation frame, and the universal wheel component, the drive component, the detection component, the ablation component, and the ablation claw component are all connected to the controller.

Preferably, the universal wheel component comprises a hydraulic rod arranged on the transmission frame in the circumferential direction and a universal roller connected to the hydraulic rod, and wherein the universal roller is connected to an output of the drive component, and the hydraulic rod is connected to the controller.

Preferably, the detection component comprises a temperature detector, a mounting frame, a rotating motor, a rotating gear set, and a rotating gear ring, and wherein an inner wall of the detection frame extends inward in the circumferential direction to form a cam fixedly connected to the rotating gear ring, both sides of the cam are recessed inward to form a guide groove, the temperature detector and the rotating motor are both arranged at one end of the mounting frame, the other end of the mounting frame is slidably connected to the guide groove, the rotating motor is meshed and connected to the rotating gear ring through a rotating gear, and the temperature detector and the rotating motor are both connected to the controller.

Preferably, a centralizing component is further included, wherein the centralizing component comprises a plurality of cylinders and support rods arranged on the detection frame in the circumferential direction, and wherein the support rods are connected to the detection frame through the cylinders.

Preferably, the ablation component comprises a plurality of heaters and locators, and wherein the locators are fixedly connected to the ablation frame, the heaters are arranged on an inner wall of the ablation frame in the circumferential direction, and the heaters and the locators are all connected to the controller.

Preferably, the heaters are microwave heaters.

Preferably, the number of the transmission mechanisms is 3, respectively a first transmission mechanism, a second transmission mechanism, and a third transmission mechanism, and wherein the first transmission mechanism is connected to the detection frame, the second transmission mechanism, the ablation frame, and the third transmission mechanism sequentially through the elastic connector.

Preferably, the transmission frame comprises an upper frame, a lower frame, and a hydraulic connector, and wherein the upper frame is connected to the lower frame through the hydraulic connector, and the hydraulic connector is connected to the controller.

Preferably, the ablation claw component comprises an upper mechanical arm, a lower mechanical arm, an upper push claw, and a lower push claw, and wherein the upper push claw passes through the upper mechanical arm and an outer wall of the ablation frame, the lower push claw passes through the lower mechanical arm and the outer wall of the ablation frame, and the upper mechanical arm and the lower mechanical arm are both connected to the controller.

In order to achieve the second objective above, the technical solution adopted by the present application is as follows.

A method for detecting and ablating hydrates in a natural gas pipeline, applied to the controller of the device for detecting and ablating hydrates in the natural gas pipeline according to any one of claims 1-9, wherein the controller comprises a memory and a processor, and wherein the memory is configured to store program instructions; and the processor is configured to run the program instructions to perform the following steps:

S1: adjusting a gap between the upper frame and the lower frame through the hydraulic connector, and generating static friction between the universal roller driven by the hydraulic rod and an outer surface of the inner natural gas pipeline;

S2: driving the universal roller by the drive component to drive the device for detecting and ablating hydrates in the natural gas pipeline to move along the natural gas pipeline;

S3: acquiring a first signal sent by the temperature detector, and determining whether the temperature is below a preset range, if yes, stopping moving the device for detecting and ablating hydrates in the natural gas pipeline, and performing S4, and if not, continuing moving the device for detecting and ablating hydrates in the natural gas pipeline along the natural gas pipeline, and performing S3;

S4: driving the support rods by the cylinders of the centralizing component to project outward such that the center of the inner natural gas pipeline coincides with the center of the detection frame, and then driving the rotating gear by the rotating motor to drive the temperature detector on the mounting frame to rotate around the inner natural gas pipeline;

S5: acquiring a second signal sent by the temperature detector, and driving the upper mechanical arm to drive the upper push claw to be fixedly connected to one end of an inner wall of an outer natural gas pipeline, and the lower mechanical arm to drive the lower push claw to be fixedly connected to the other end of the inner wall of the outer natural gas pipeline such that the ablation frame is fixed at a designated location;

S6: driving the heaters to heat the inner natural gas pipeline and at the same time acquiring a signal sent by the locator; and S7: acquiring a third signal sent by the temperature detector, and determining whether the temperature is below the preset range, if yes, performing S6; and if not, performing S2.

Compared with the prior art, the present application has the following beneficial effects. The gap between the upper frame and the lower frame is adjusted through the hydraulic connector, such that the transmission frame can be adapted to natural gas pipelines of different calibers. Static friction is generated between the universal roller driven by the hydraulic rod and the outer surface of the natural gas pipeline. At the same time, the detection mechanism and the ablation mechanism are both connected to the transmission mechanism through the elastic connector, such that the device can smoothly pass through bends in the natural gas pipeline. Further, the temperature detector of the detection mechanism detects the temperature of the natural gas pipeline and determines whether hydrates are generated in the natural gas pipeline to block the pipeline, and then the blockage is heated by the ablation mechanism to ablate the hydrates. Since the hydrates are ablated by heating instead of inhibiting the production of hydrates by chemical suppression reagents, the use of chemical reagents is reduced, environmental pollution is avoided, and environmentally friendly operations are realized.

Figure 1:
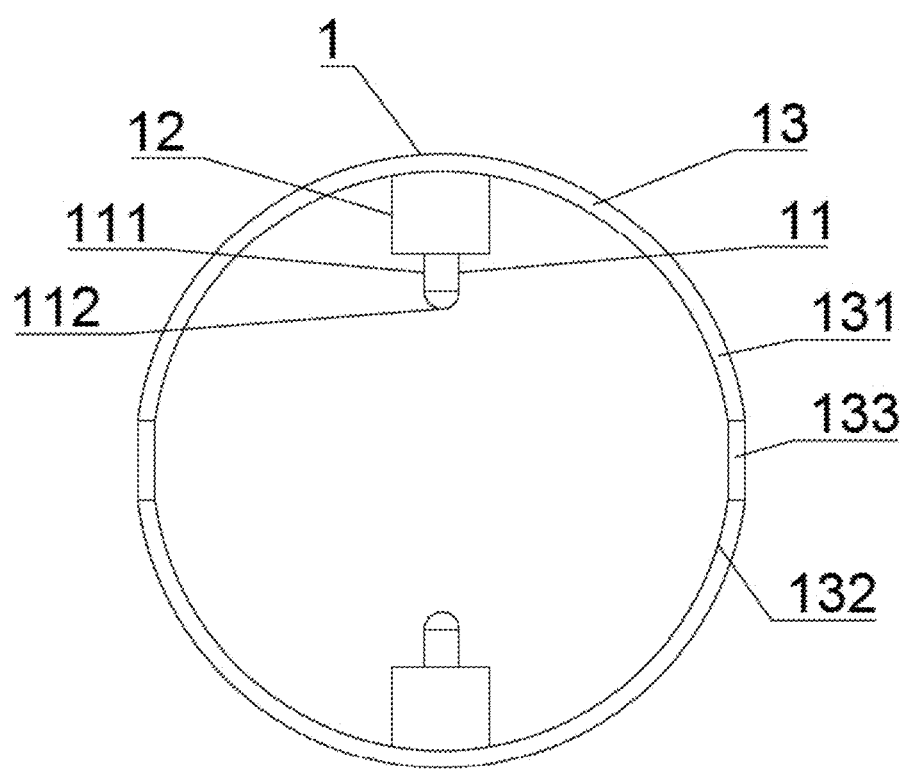
FIG. 1 is a schematic diagram of the structure of a transmission mechanism according to the present application.
Figure 2:
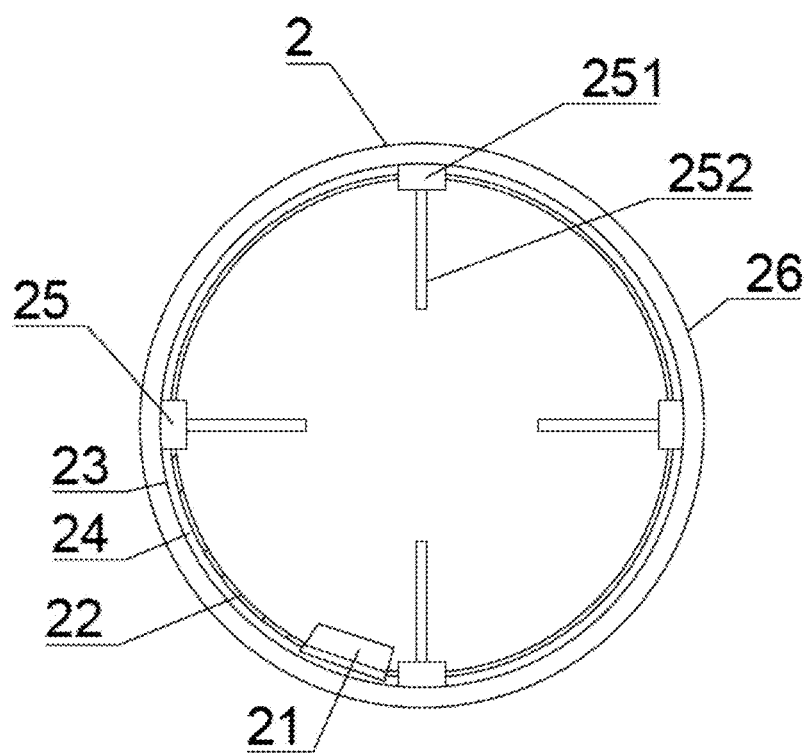
FIG. 2 is a schematic diagram of the structure of a detection mechanism according to the present application.
Figure 3:
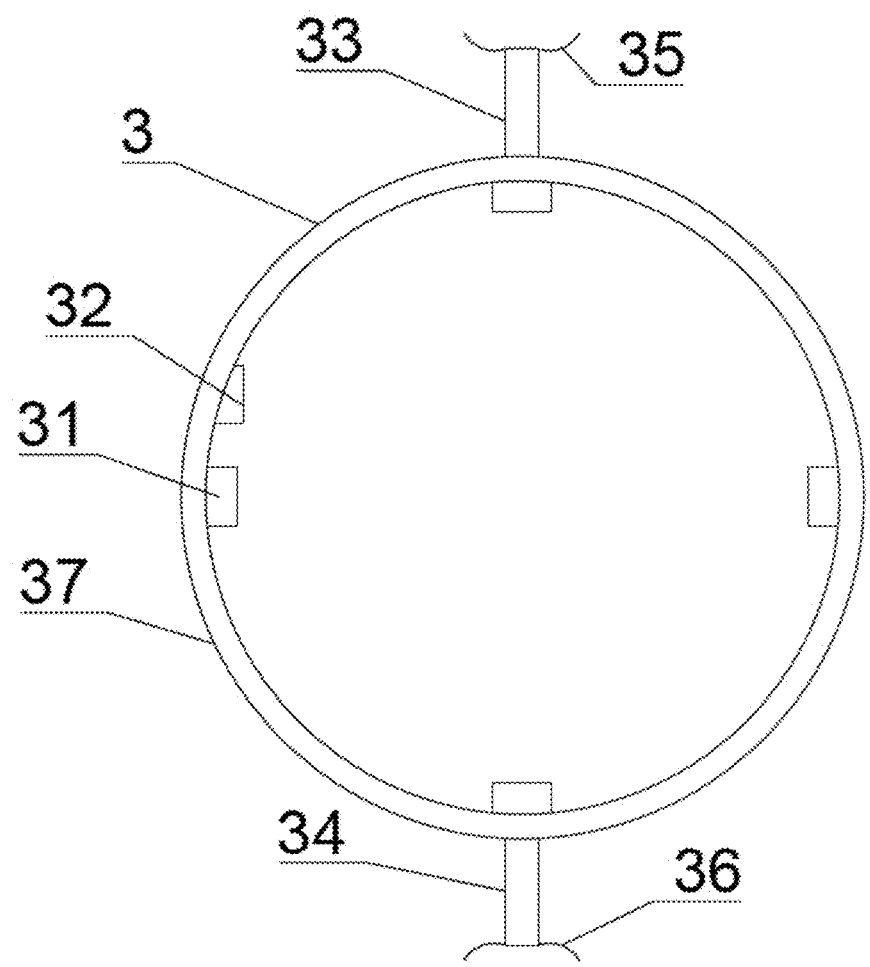
FIG. 3 is a schematic diagram of the structure of an ablation mechanism according to the present application.

In the figures: 1—transmission mechanism; 11—universal wheel component; 111—hydraulic rod; 112—universal roller; 12—drive component; 13—transmission frame; 131—upper frame; 132—lower frame; 133—hydraulic connector; 2—detection mechanism; 21—temperature detector; 22—rotating gear ring; 23—cam; 24—guide groove; 25—centralizing component; 251—cylinder; 252—support rod; 26—detection frame; 3—ablation mechanism; 31—heater; 32—locator; 33—upper mechanical arm; 34—lower mechanical arm; 35—upper push claw; 36—lower push claw; 37—ablation frame; 4—natural gas pipeline; 41—outer natural gas pipeline; 42—inner natural gas pipeline; 5—elastic connector.

DETAILED DESCRIPTION

Preferred embodiments of the present application will be described below with reference to the accompanying drawings. It should be understood that the preferred embodiments described here are merely intended to illustrate and explain the present application, and are not used to limit the present application.

In the description of the present application, it should be noted that orientations or locational relationships indicated by terms "center", "upper", "lower", "left", "right", "vertical", "horizontal", "inner", "outer", and the like are based on orientations or locational relationships shown in the drawings, and are merely for the convenience of describing the present application and simplifying the description, rather than indicating or implying that the indicated device or element must have a specific orientation or be constructed or operated in a specific orientation, and thus cannot therefore be understood as a limitation of the present application. In addition, terms "first", "second", and "third" are merely used for descriptive purposes, and cannot be understood as indicating or implying relative importance.

In the description of the present application, it should be noted that, unless otherwise clearly specified and limited, terms "install", "connect with" and "connect to" should be understood in a broad sense. For example, it can be a fixed connection or a detachable connection or an integral connection; it can be a mechanical connection or an electrical connection; it can be a direct connection or an indirect connection through an intermediate medium, and it can be an internal communication between two components. For those of ordinary skill in the art, the specific meanings of the above terms in the present application can be understood in specific situations.

Figure 4:
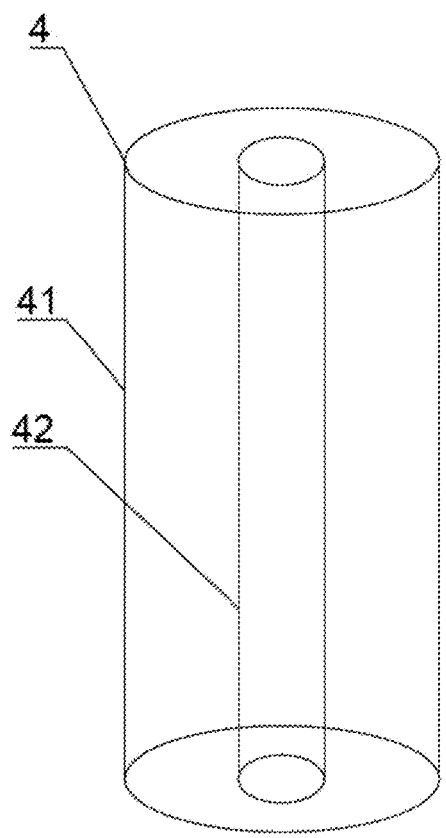
FIG. 4 is a schematic diagram of the structure of a double-layer bushing according to the present application.

In the following, the present application will be further described with reference to the drawings and specific implementations:

In the present application, a natural gas pipeline 4 has a double-layer bushing structure. As shown in FIG. 4, an inner layer is a natural gas transportation pipeline, and an outer layer is a hollow structure. That is, a certain gap exists between an inner natural gas pipeline 42 and an outer natural gas pipeline 41. Water, sediment or a device for detecting and ablating hydrates in a natural gas pipeline can pass through the gap. The hydrates are natural gas hydrates, commonly known as combustible ice, with a melting point of 20° C., which is formed at 0-10° C., and the seabed temperature is generally maintained at about 2-4° C. Specifically, the device for detecting and ablating hydrates in a natural gas pipeline has a built-in battery module for energy supply, and the controller is a data processor, but is not limited to a 32-bit or 64-bit data processor.

Embodiment I

Figure 5:
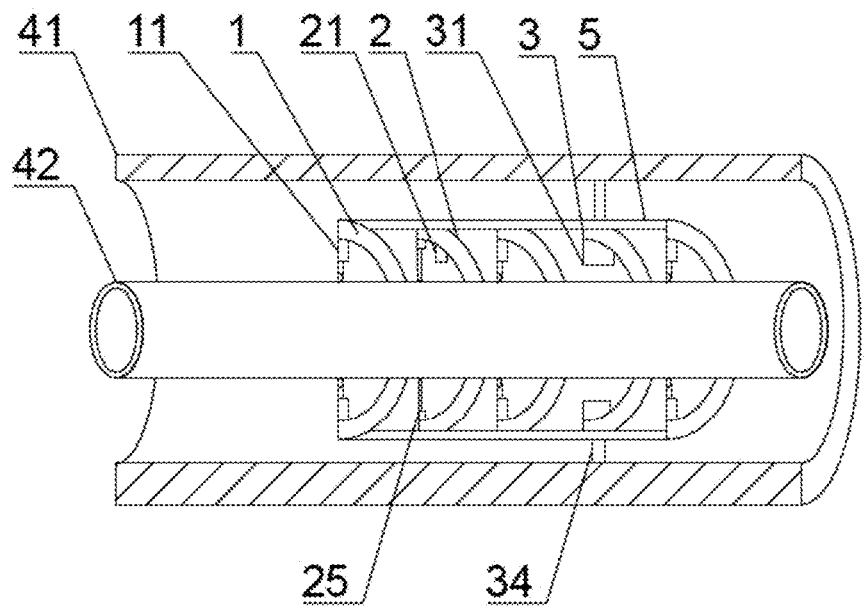
FIG. 5 is a schematic structural diagram of a device for detecting and ablating hydrates in a natural gas pipeline according to the present application.

As shown in FIGS. 1-5, in this embodiment, a device for detecting and ablating hydrates in a natural gas pipeline includes a plurality of transmission mechanisms 1 movable along the inner natural gas pipeline 42, a detection mechanism 2 configured to detect the hydrates in the natural gas pipeline, an ablation mechanism 3 configured to ablate the hydrates, and a controller. Specifically, the transmission mechanism 1 includes a transmission frame 13, a plurality of universal wheel components 11 that generate static friction with an outer wall of the inner natural gas pipeline 42, a drive component 12, and an elastic connector 5. The transmission frame 13 is not limited to be of a circular shape, but can also be of a triangular shape, a rectangular shape and the like. Preferably, the transmission frame 13 includes an upper frame 131, a lower frame 132, and a hydraulic connector 133. The upper frame 131 is connected to the lower frame 132 through the hydraulic connector 133. The hydraulic connector 133 is connected to the controller. A gap between the upper frame 131 and the lower frame 132 is adjusted through the hydraulic connector 133. That is, the size of a hollow body enclosed by the upper frame 131 and the lower frame 132 is adjusted by the hydraulic connector 133, such that the transmission frame 13 can be adapted to natural gas inner pipelines of different calibers. The universal wheel component 11 includes a hydraulic rod 111 arranged on the transmission frame 13 in a circumferential direction and a universal roller 112 connected to the hydraulic rod 111. The universal roller 112 is connected to an output of the drive component 12. In this embodiment, the universal roller 112 is designed to cope with the bends of the natural gas pipeline 4 in various directions. The drive component 12 includes a straight drive motor and a self-rotating drive motor. The straight drive motor drives the universal roller 112 to travel straight. The self-rotating drive motor drives the universal roller 112 to rotate around the inner natural gas pipeline 42. Preferably, the number of the transmission mechanism 1 is 3, respectively a first transmission mechanism, a second transmission mechanism, and a third transmission mechanism. The first transmission mechanism 1 is connected to the detection frame 26, the second transmission mechanism, the ablation frame 37, and the third transmission mechanism sequentially through the elastic connector 5, as shown in FIG. 5. The elastic connector 5 may be a spring or a spring leaf. When the device for detecting and ablating hydrates in the natural gas pipeline moves to a turn of the natural gas pipeline, the universal roller 112 can be driven by the drive component 12 to drive the device for detecting and ablating hydrates in the natural gas pipeline to spiral along the inner natural gas pipeline, so as to quickly and smoothly pass the turn.

In this embodiment, the detection mechanism 2 includes a detection frame 26 and a detection component. Preferably, the detection component includes a temperature detector 21, a mounting frame, a rotating motor, a rotating gear set, and a rotating gear ring 22. An inner wall of the detection frame 26 extends inward in the circumferential direction to form a cam 23 fixedly connected to the rotating gear ring 22. Both sides of the cam 23 are recessed inward to form a guide groove 24. The temperature detector 21 and the rotating motor are both provided at one end of the mounting frame. The other end of the mounting frame is slidably connected to the guide groove 24. The rotating motor is meshed and connected to the rotating gear ring 22 through a rotating gear. The temperature detector 21 always detects the temperature in the inner natural gas pipeline 42 with the movement of the device. Since the temperature of natural gas is significantly different from the normal temperature of natural gas, it is recognized that hydrates exist in the pipe. Specifically, when the temperature detector 21 detects an abnormal temperature, the universal roller 112 is braked, and then the rotating motor is meshed and connected to the rotating gear ring 22 through the rotating gear, and the temperature detector 21 on the mounting frame is driven to rotate around this location to accurately determine the formation of hydrates. Through system analysis, the best ablation plan is obtained. A centralizing component 25 is further included. The centralizing component 25 includes a plurality of cylinders 251 and support rods 252 arranged on the detection frame 26 in the circumferential direction. The support rods 252 are connected to the detection frame 26 through the cylinders 251. The cylinders 251 of the centralizing component 25 drive the support rods 252 to project outward. The support rods 252 abut against the outer natural gas pipeline 41 or the inner natural gas pipeline 42 through soft contacts at extreme ends, such that the center of the inner natural gas pipeline 42 coincides with the center of the detection frame 26. Then the rotating gear is driven by the rotating motor to drive the temperature detector 21 on the mounting frame to rotate around the inner natural gas pipeline 42, so as to avoid the temperature detector 21 rotating around the inner natural gas pipeline 42 from collision with the inner natural gas pipeline 42 which may cause an accident, improving the detection progress of the temperature detector 21, and being able to detect the formation of hydrates in the natural gas pipeline 4 more accurately.

In this embodiment, the ablation mechanism 3 includes an ablation frame 37, an ablation component, and an ablation claw component. Preferably, the ablation component includes a plurality of heaters 31 and locators 32. The locators 32 are fixedly connected to the ablation frame 37. The heaters 31 are arranged on an inner wall of the ablation frame 37 in the circumferential direction. The heaters 31 and the locators 32 are all connected to the controller. After the temperature detector 21 completes the detection of hydrates at a certain place, the locator 32 accurately locates the hydrates. Further, the location of hydrate blockage can also be obtained by other hydrate detection devices. Through the transmission mechanism 1, the ablation mechanism 3 is directly transported to the location of hydrate blockage for ablation. The locator 32 synchronizes the location of the ablation mechanism 3 to a communication terminal in real time. The heaters 31 on the ablation frame 37 can obtain the best ablation plan based on system analysis and start to heat the hydrates in the inner natural gas pipeline 42. For example, there are more hydrates in a lower portion of the inner natural gas pipeline 42, and the output power of the heater 31 proximal to the lower portion of the inner natural gas pipeline 42 is higher than the output power of the heater 31 distal from the lower portion of the inner natural gas pipeline 42. Preferably, the heaters 31 are microwave heaters or underwater heaters, and heat the temperature of a corresponding location to above 20° C. to ablate the hydrates. Preferably, the ablation claw component includes an upper mechanical arm 33, a lower mechanical arm 34, an upper push claw 35, and a lower push claw 36. The upper push claw 35 passes through the upper mechanical arm 33 and the outer wall of the ablation frame 37. The lower push claw 36 passes through the lower mechanical arm 34 and the outer wall of the ablation frame 37. The upper mechanical arm 33 and the lower mechanical arm 34 are both connected to the controller. The ablation frame 37 is fixed by the upper push claw 35 and the lower push claw 36 at a relatively stable location, which is also the best location to promote the ablation of the hydrates in the inner natural gas pipeline 42 to avoid heat loss and reduce electrical energy consumption.

Embodiment II

Figure 6:
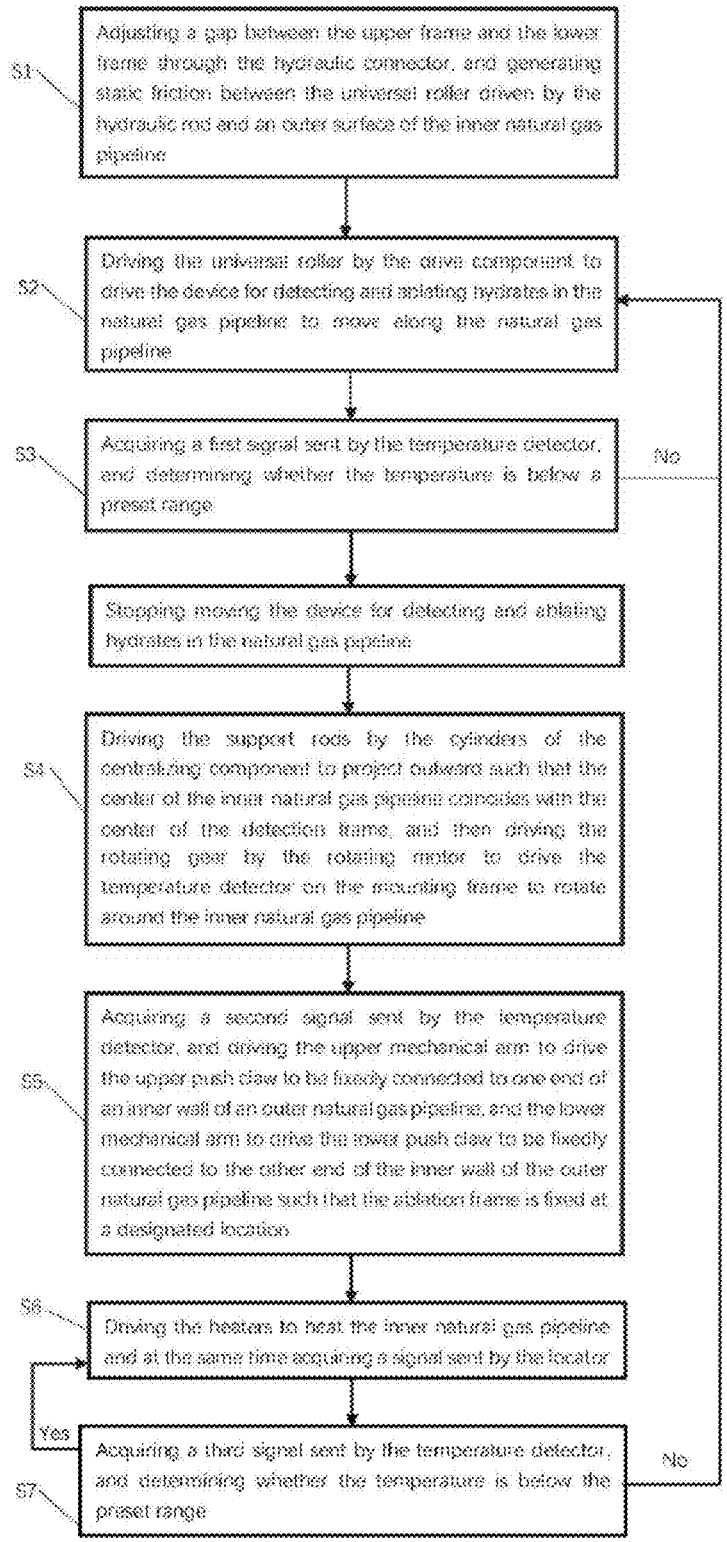
FIG. 6 is a flow chart of a method for detecting and ablating hydrates in a natural gas pipeline according to the present application.

As shown in FIG. 6, a method for detecting and ablating hydrates in a natural gas pipeline is applied to the controller of the device for detecting and ablating hydrates in the natural gas pipeline according to embodiment I. The controller includes a memory and a processor.

The memory is configured to store program instructions.

The processor is configured to run the program instructions to perform the following steps.

S1: A gap between the upper frame 131 and the lower frame 132 is adjusted through the hydraulic connector 133, and static friction is generated between the universal roller 112 driven by the hydraulic rod 111 and an outer surface of the inner natural gas pipeline 42.

Specifically, before the device for detecting and ablating hydrates in the natural gas pipeline is put into the natural gas pipeline 4, the gap between the upper frame 131 and the lower frame 132 is adjusted through the hydraulic connector 133, that is, the size of a hollow body enclosed by the upper frame 131 and the lower frame 132 is adjusted through the hydraulic connector 133, such that the transmission frame 13 can be adapted to inner natural gas pipelines of different calibers. In this case, static friction should be generated between the universal roller 112 and the outer wall of the inner natural gas pipeline, which can be regarded as the device for detecting and ablating hydrates in the natural gas pipeline fixedly staying at a certain location in the inner natural gas pipeline.

S2: The universal roller 112 is driven by the drive component 12 to drive the device for detecting and ablating hydrates in the natural gas pipeline to move along the natural gas pipeline 4.

Specifically, driven by the drive component 12, the universal roller 112 should generate rolling friction with an outer wall of the inner natural gas pipeline, that is, the device for detecting and ablating hydrate in the natural gas pipeline moves along the natural gas pipeline 4.

S3: A first signal sent by the temperature detector 21 is acquired and whether the temperature is below a preset range is determined. If yes, the device for detecting and ablating hydrates in the natural gas pipeline stops moving, and S4 is performed. If not, then the device for detecting and ablating hydrates in the natural gas pipeline continues to move along the natural gas pipeline 4, and S3 is performed.

Specifically, the first signal is a low-temperature abnormality signal. During the movement of the device for detecting and ablating hydrates in the natural gas pipeline along the natural gas pipeline 4, the temperature detector 21 continuously detects the temperature in the inner natural gas pipeline 42. When the temperature detector 21 detects that the temperature in the inner natural gas pipeline 42 is abnormal (low-temperature abnormality, about 2-4° C.), in which under normal circumstances, the temperature of the hydrates is lower than the temperature of the natural gas, then the device 4 for detecting and ablating hydrates in the natural gas pipeline stops moving and starts to perform detailed detection at this location. If nothing is found, the device for detecting and ablating hydrates in the natural gas pipeline continues to move.

S4: The support rods 252 are driven by the cylinders 251 of the centralizing component 25 to project outward, such that the center of the inner natural gas pipeline 42 coincides with the center of the detection frame 26, and then the rotating gear 21 is driven by the rotating motor to drive the temperature detector on the mounting frame to rotate around the inner natural gas pipeline 42.

Specifically, when the temperature detector 21 detects an abnormal temperature, the universal roller 112 is braked. In this case, the universal roller 112 should generate static friction with the outer wall of the inner natural gas pipeline. The support rods 252 are driven by the cylinders 251 of the centralizing component 25 to project outward. The support rods 252 abut against the outer natural gas pipeline 41 or the inner natural gas pipeline 42 through soft contacts at extreme ends, such that the center of the inner natural gas pipeline 42 coincides with the center of the detection frame 26. Then, the rotating gear is driven by the rotating motor to drive the temperature detector 21 on the mounting frame to rotate around the inner natural gas pipeline 42 to accurately determine the formation of hydrates, and the best ablation plan can be obtained through system analysis.

S5: A second signal sent by the temperature detector 21 is acquired, the upper mechanical arm 33 drives the upper push claw 35 to be fixedly connected to one end of the inner wall of the outer natural gas pipeline 41, and the lower mechanical arm 34 drives the lower push claw 36 to be fixedly connected to the other end of the inner wall of the outer natural gas pipeline 41, such that the ablation frame 37 is fixed at a designated location.

Specifically, the second signal is the detailed situation detected by the temperature detector 21. The situation of the hydrates in the inner natural gas pipeline 42 is analyzed in detail according to the second signal. The ablation frame 37 is fixed at a relatively stable location by the upper push claw 35 and the lower push claw 36 through the mechanical arm, which is also the best location to promote the ablation of the hydrates in the inner natural gas pipeline 42, ready for heating.

S6: The heaters 31 are driven to heat the inner natural gas pipeline 42 and at the same time a signal sent by the locator 32 is acquired.

Specifically, the heaters 31 are microwave heaters or underwater heaters. The locator 32 adopts a USBL ultrashort baseline locating system. The locator 32 accurately locates the hydrates. The heaters 31 on the ablation frame 37 can start to heat the hydrates in the inner natural gas pipeline 42 according to the best ablation plan obtained through system analysis. For example, there are more hydrates in a lower portion of the inner natural gas pipeline 42, and the output power of the heater 31 proximal to the lower portion of the inner natural gas pipeline 42 is higher than the output power of the heater 31 distal from the lower portion of the inner natural gas pipeline 42. Preferably, the heaters 31 are microwave heaters or underwater heaters, and heat the temperature of a corresponding location to above 20° C. to ablate the hydrates.

S7: A third signal sent by the temperature detector 21 is acquired, and whether the temperature is lower than the preset range is determined, if yes, S6 is performed; and if not, S2 is performed.

Specifically, the third signal is a temperature signal. After the ablation is completed, the temperature detector 21 detects this location again. If no abnormal low temperature (2-4° C.) is found, the drive component 12 drives the universal roller 112 again to drive the device for detecting and ablating hydrates in the natural gas pipeline to move along the natural gas pipeline 4. If there is still an abnormal low temperature, the heating will be restarted again.

For those skilled in the art, various other corresponding changes and deformations can be made based on the technical solutions and concepts described above, and all these changes and deformations should fall within the scope of protection of the claims of the present application.

What is claimed is:

1. A device for detecting and ablating hydrates in a natural gas pipeline, comprising: a plurality of transmission mechanisms movable along an inner natural gas pipeline, a detection mechanism configured to detect the hydrates in the natural gas pipeline, an ablation mechanism configured to ablate the hydrates, and a controller, wherein at least one of the transmission mechanisms comprises a transmission frame, a plurality of universal wheel components that generate static friction with an outer wall of the inner natural gas pipeline, a drive component, and an elastic connector; the detection mechanism comprises a detection frame and a detection component; the ablation mechanism comprises an ablation frame, an ablation component, and an ablation claw component, and wherein the universal wheel component is arranged on an inner wall of the transmission frame in a circumferential direction, the drive component is connected to the universal wheel component, the detection frame and the ablation frame are both connected to the transmission frame through the elastic connector, the detection component is arranged on the detection frame, the ablation component and the ablation claw component are both arranged on the ablation frame, and the universal wheel component, the drive component, the detection component, the ablation component, and the ablation claw component are all connected to the controller.

2. The device for detecting and ablating hydrates in the natural gas pipeline according to claim 1, wherein the universal wheel component comprises a hydraulic rod arranged on the transmission frame in the circumferential direction and a universal roller connected to the hydraulic rod, and wherein the universal roller is connected to an output of the drive component, and the hydraulic rod is connected to the controller.

3. The device for detecting and ablating hydrates in the natural gas pipeline according to claim 1, wherein the detection component comprises a temperature detector, a mounting frame, a rotating motor, a rotating gear set, and a rotating gear ring, and wherein an inner wall of the detection frame extends inward in the circumferential direction to form a cam fixedly connected to the rotating gear ring, both sides of the cam are recessed inward to form a guide groove, the temperature detector and the rotating motor are both arranged at one end of the mounting frame, the other end of the mounting frame is slidably connected to the guide groove, the rotating motor is meshed and connected to the rotating gear ring through the rotating gear set, and the temperature detector and the rotating motor are both connected to the controller.

4. The device for detecting and ablating hydrates in the natural gas pipeline according to claim 3, further comprising a centralizing component, wherein the centralizing component comprises a plurality of cylinders and support rods arranged on the detection frame in the circumferential direction, and wherein the support rods are connected to the detection frame through the cylinders.

5. The device for detecting and ablating hydrates in the natural gas pipeline according to claim 1, wherein the ablation component comprises a plurality of heaters and locators, and wherein the locators are fixedly connected to the ablation frame, the heaters are arranged on an inner wall of the ablation frame in the circumferential direction, and the heaters and the locators are all connected to the controller.

6. The device for detecting and ablating hydrates in the natural gas pipeline according to claim 5, wherein the heaters are microwave heaters.

7. The device for detecting and ablating hydrates in the natural gas pipeline according to claim 1, wherein the number of the transmission mechanisms is 3, respectively a first transmission mechanism, a second transmission mechanism, and a third transmission mechanism, and wherein the first transmission mechanism is connected to the detection frame through the elastic connector, the detection frame is connected to the second transmission mechanism through the elastic connector, the second transmission mechanism is connected to the ablation frame through the elastic connector, the ablation frame is connected to the third transmission mechanism through the elastic connector.

8. The device for detecting and ablating hydrates in the natural gas pipeline according to claim 7, wherein the transmission frame comprises an upper frame, a lower frame, and a hydraulic connector, and wherein the upper frame is connected to the lower frame through the hydraulic connector, and the hydraulic connector is connected to the controller.

9. The device for detecting and ablating hydrates in the natural gas pipeline according to claim 1, wherein the ablation claw component comprises an upper mechanical arm, a lower mechanical arm, an upper push claw, and a lower push claw, and wherein the upper push claw is connected to an outer wall of the ablation frame through the upper mechanical arm, the lower push claw passes is connected to the outer wall of the ablation frame through the lower mechanical arm, and the upper mechanical arm and the lower mechanical arm are both connected to the controller.

\* \* \* \* \*